(12) United States Patent
Turner et al.

(10) Patent No.: US 9,069,847 B2
(45) Date of Patent: Jun. 30, 2015

(54) DATA VISUALIZATION METHODS, DATA VISUALIZATION DEVICES, DATA VISUALIZATION APPARATUSES, AND ARTICLES OF MANUFACTURE

(75) Inventors: Alan E. Turner, Kennewick, WA (US); Vernon L. Crow, Richland, WA (US); Deborah A. Payne, Richland, WA (US); Elizabeth G. Hetzler, Kennewick, WA (US); Kristin A. Cook, Richland, WA (US); Wendy E. Cowley, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 2403 days.

(21) Appl. No.: 11/256,225

(22) Filed: Oct. 21, 2005

(65) Prior Publication Data

US 2007/0094592 A1      Apr. 26, 2007

(51) Int. Cl.
*G06F 17/00* (2006.01)
*G06F 17/30* (2006.01)

(52) U.S. Cl.
CPC .... *G06F 17/30713* (2013.01); *G06F 17/30598* (2013.01); *G06F 17/30011* (2013.01)

(58) Field of Classification Search
CPC ..................... G06F 17/30011; G06F 17/30598
USPC .................................................. 715/205, 273
See application file for complete search history.

(56) References Cited

U.S. PATENT DOCUMENTS

| | | | |
|---|---|---|---|
| 4,839,853 A | | 6/1989 | Deerwester et al. |
| 5,159,667 A | * | 10/1992 | Borrey et al. ................. 715/205 |
| 6,282,548 B1 | * | 8/2001 | Burner et al. ............. 707/104.1 |
| 6,298,174 B1 | | 10/2001 | Lantrip et al. |
| 6,356,922 B1 | * | 3/2002 | Schilit et al. .................. 715/236 |
| 6,446,061 B1 | * | 9/2002 | Doerre et al. ................. 707/738 |
| 6,484,168 B1 | | 11/2002 | Pennock et al. |

(Continued)

FOREIGN PATENT DOCUMENTS

WO    WO 2005/073881 A1    8/2005

OTHER PUBLICATIONS

Bernstein, "Storyspace 1", Proceedings of the thirteenth ACM conference on Hypertext and hypermedia, published 2002, p. 172-181.*

(Continued)

*Primary Examiner* — Amelia Tapp
(74) *Attorney, Agent, or Firm* — Wells St. John P.S.

(57) ABSTRACT

Data visualization methods, data visualization devices, data visualization apparatuses, and articles of manufacture are described according to some aspects. In one aspect, a data visualization method includes accessing a plurality of initial documents at a first moment in time, first processing the initial documents providing processed initial documents, first identifying a plurality of first associations of the initial documents using the processed initial documents, generating a first visualization depicting the first associations, accessing a plurality of additional documents at a second moment in time after the first moment in time, second processing the additional documents providing processed additional documents, second identifying a plurality of second associations of the additional documents and at least some of the initial documents, wherein the second identifying comprises identifying using the processed initial documents and the processed additional documents, and generating a second visualization depicting the second associations.

31 Claims, 6 Drawing Sheets

(56) References Cited

U.S. PATENT DOCUMENTS

| | | | |
|---|---|---|---|
| 6,564,202 B1* | 5/2003 | Schuetze et al. | 707/2 |
| 6,584,220 B2 | 6/2003 | Lantrip et al. | |
| 6,598,047 B1* | 7/2003 | Russell et al. | 1/1 |
| 6,772,170 B2 | 8/2004 | Pennock et al. | |
| 6,778,193 B2* | 8/2004 | Biebesheimer et al. | 715/805 |
| 6,912,536 B1* | 6/2005 | Ochitani | 707/737 |
| 7,373,612 B2* | 5/2008 | Risch et al. | 715/850 |
| 7,421,660 B2* | 9/2008 | Charnock et al. | 715/751 |
| 7,707,210 B2* | 4/2010 | Stefik et al. | 707/736 |

OTHER PUBLICATIONS

Taking Topic Detection From Evaluation to Practice; Allan at al.; Proceedings from the 38th Hawaii Int'l Conf. on Systems Sciences; 2005; pp. 1-10.

Sensemaking of Evolving Web Sites Using Visualization Spreadsheets; Chi et al.; Proceedings of Information Visualization '99; 1999; pp. 19-25.

Change Blindness in Information Visualization: A Case Study; Nowell et al.; Proc. of the IEEE Symposium on Information Visualization; 2001; pp. 15-22.

"Galaxy of News" An Approach to Visualizing and Understanding Expansive News Landscapes; Rennison; Proc. of the ACM Symposium on Use Interface Software and Technology; 1994; pp. 3-12.

"Visualizing Live Text Streams using Motion and Temporal Pooling"; Albrecht-Buehler et al.; IEEE Computer Graphics and Applications, vol. 25, No. 3, Mar. 2005; pp. 52-59.

"BreakingStory: Visualizing Change in Online News"; Fitzpatrick et al.; CHI 2003: New Horizons; Posters: Mass Communication; Apr. 5-10, 2003; pp. 900-901.

"Visualization of Information Stream based on Keyword Map System"; Takama et al.,, SICE Annual Conference in Fukui; Aug. 4-6, 2003; pp. 202-207.

"ThemeRiver: Visualizing Theme Changes over Time"; Havre et al.; Information Visualization; INFOVIS 2000; Oct. 9-10, 2000; pp. 115-123.

"Visual Unrolling of Network Evolution and the Analysis of Dynamic Discourse"; Brandes et al.; Proc of the 38th Annual Hawaii Int'l Conf. on System Sciences; Jan. 3-6, 2005; pp. 145-152.

"Analysis Experiences Using Information Visualization"; Hetzler et al.; IEEE Computer Society; Sep./Oct. 2004; pp. 22-26.

"A Cluster-Based Approah to Tracking, Detection and Segmentation of Bradcast News"; Eichmann et al.; http://nist.gov/speech/publications/darpa99/html/tdt130/rdt130.html; Feb. 28-Mar. 3, 1999.

http://in-spire.pnl.gov; Jul. 2004; 1 p.

"TextPool: Visualizing Live Text Streams"; Albrecht-Buehler et al.; Northwestern University; Oct. 10, 2004; 2pp.

"Multiagent Model of Dynamic Design" "Visualization as an Emergent Behavior of Active Design Agents"; Ishizaki; CHI 96, Papers; Apr. 13-18, 1996; pp. 347-354.

"Dynamic Visualization of Transient Data Streams"; Wong et al.; IEEE Symposium on Information Visualization 2003; Oct. 19-23, 2003, pp. 97-104.

* cited by examiner

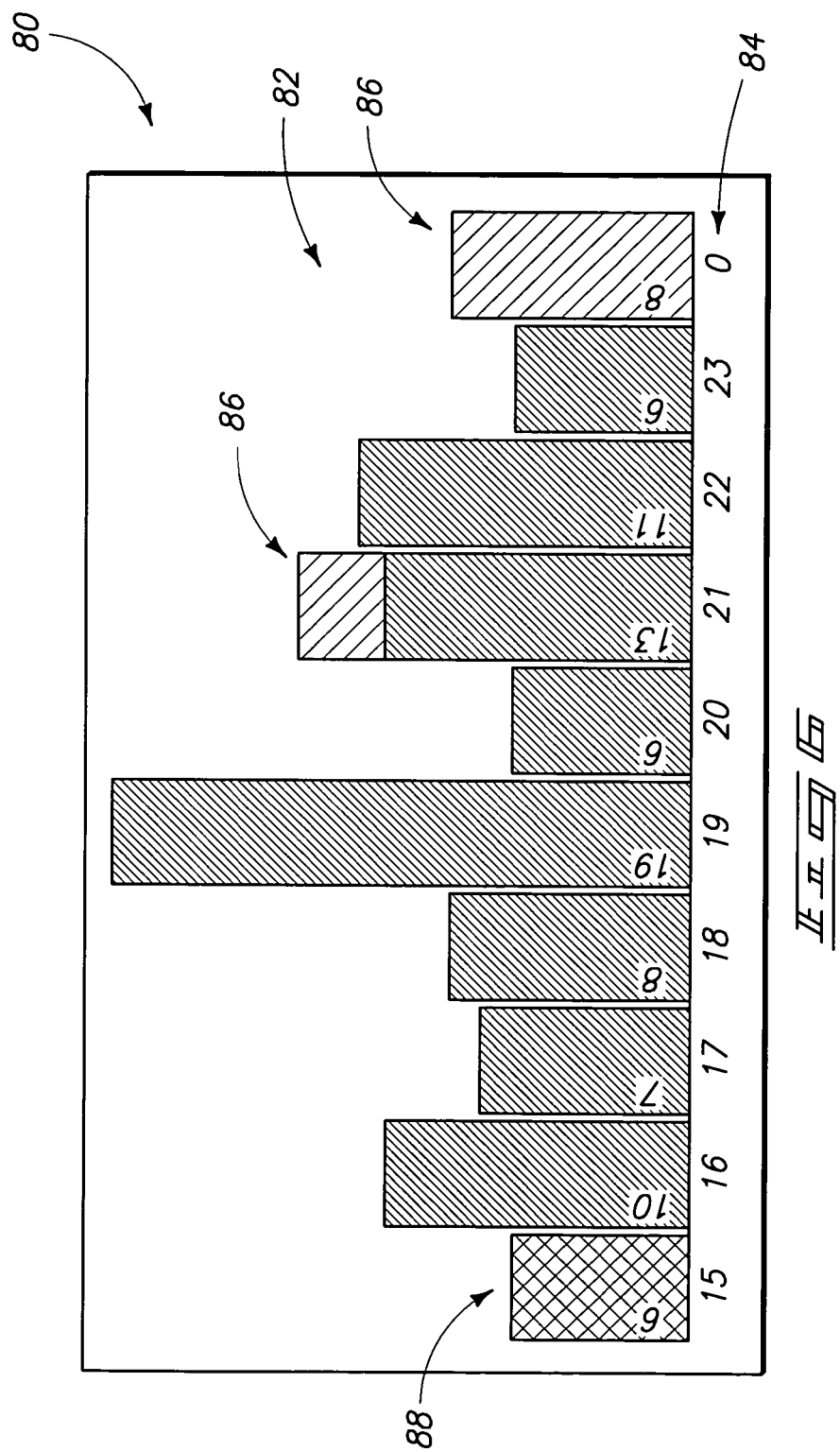

DATA VISUALIZATION METHODS, DATA VISUALIZATION DEVICES, DATA VISUALIZATION APPARATUSES, AND ARTICLES OF MANUFACTURE

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This invention relates to data visualization methods, data visualization devices, data visualization apparatuses, and articles of manufacture.

BACKGROUND

Text analysis tools are gaining popularity in use by analysts. Many text analysis tools operate on a fixed set of data which may be appropriate in a number of applications such as common evaluation or duplication of results. However, analyzing fixed sets of data can lead to a focus on fixed "bucket of data" approaches where as a user may utilize profiles or standing queries that constantly reflect the latest information at different moments in time.

A user may benefit from a visual analysis system which allows them to add new documents to an ongoing exploration. However, if the visualization is computed every time, an analyst may lose the context and exploration results stored from previous work. Further, analysts may not be able to compare differences between visualizations if they exit the visualization before new computations take place.

As described below, at least some aspects of the disclosure provide improved data visualization methods and apparatus.

BRIEF DESCRIPTION OF THE DRAWINGS

Preferred embodiments of the invention are described below with reference to the following accompanying drawings.

FIG. 6 is a screen display illustrating information regarding documents arranged by date/time of publication compared to receipt of the documents according to one embodiment.

DETAILED DESCRIPTION

At least some aspects of the disclosure provide methods and apparatus for processing text contained in a plurality of documents and generating visualizations resulting from the processing. Exemplary processing may create associations of documents with one another. For example, in one embodiment, the analysis may generate a plurality of clusters of documents wherein documents of a given cluster may be considered to be associated with one another (e.g., related to common topic) in one embodiment. Labels may also be provided and which are used to identify clusters to assist a user with analysis of the documents.

A document may refer to a communication comprising a plurality of text words. Some examples of documents which may be processed and analyzed include publications (e.g., newspaper articles, magazine articles, books), word processor files, e-mails, chat room communications, speech transcriptions, etc.

At least some aspects of the disclosure analyze documents which may become dynamically available to the apparatus, for example, by publication, creation, interception or other means. The analysis is performed at a plurality of moments in time using documents which are present for processing and visualization. In one embodiment, the visualizations may correspond to documents which are received in a constantly moving window of time. For example, the processing circuitry may generate visualizations using documents which have been received within a fixed period of time relative to the present moment in time. Documents which have been present for a predetermined amount of time may be aged-off as outside of the moving window of interest while newly received documents are added. Accordingly, the visualizations may be updated at a plurality of moments in time corresponding to processing of documents within the window at different moments in time as time progresses. Resultant analyses of the documents may be displayed upon a computer screen for a user at a plurality of moments in time as new documents are made available and/or aged documents are discarded in one embodiment. Some aspects permit a user to pause dynamic updates of a visual representation of the analysis if a given representation is of interest to the user. Additional aspects are described with respect to exemplary illustrative embodiments.

Figure 1:
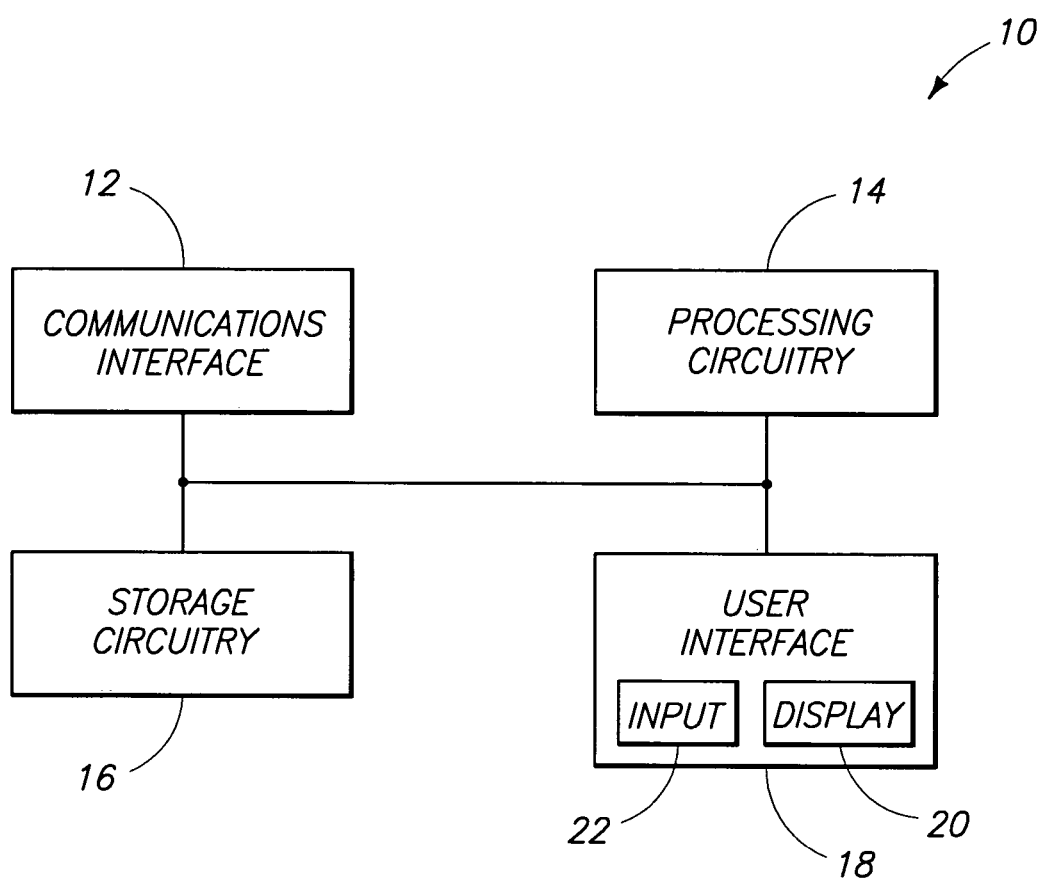
FIG. 1 is a block diagram of a data visualization apparatus according to one embodiment.

Referring to FIG. 1, an exemplary data visualization apparatus according to one embodiment is illustrated with respect to reference numeral 10. In the depicted embodiment, data visualization apparatus 10 is implemented as a computing device, such as a work station or personal computer, and may include a communications interface 12, processing circuitry 14, storage circuitry 16, and a user interface 18. Other embodiments of apparatus 10 may include more, less and/or alternative components.

Communications interface 12 is arranged to implement communications of apparatus 10 with respect to a network, external devices, etc. (not shown). For example, communications interface 12 may be arranged to communicate information bi-directionally with respect to apparatus 10. Communications interface 12 may be implemented as a network interface card (NIC), serial or parallel connection, USB port, Firewire interface, flash memory interface, floppy disk drive, or any other suitable arrangement for communicating with respect to apparatus 10.

In one embodiment, communications interface 12 is configured to dynamically receive and access documents for processing by apparatus 10. For example, communications interface 12 may be coupled with any appropriate source of documents, including for example static or dynamic databases, news feeds, email interceptors, etc. The source may dynamically provide documents to apparatus 10 as the documents are published, captured or otherwise made available.

In one embodiment, processing circuitry 14 is arranged to process data, control data access and storage, issue commands, and control other desired operations. Processing circuitry 14 may operate to access documents which are received by communications interface 12, to identify associations of the documents and to generate visualizations of the associations. Processing circuitry 14 may dynamically access documents which are made available on an ongoing basis and update the visualizations using the newly received documents in one embodiment. As mentioned above, documents may also be removed from the associations and the visualizations after they have aged a certain amount of time from their reception by apparatus 10, creation, publication, or other criteria according to an additional embodiment. Additional details regarding processing and generation of visualizations are described below according to exemplary embodiments.

Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

Storage circuitry 16 is configured to store programming such as executable code or instructions (e.g., software and/or firmware), electronic data, databases, or other digital information and may include processor-usable media. Exemplary programming may include programming configured to cause apparatus 10 to process, analyze and display information regarding a dynamically changing collection of documents. Processor-usable media includes any computer program product or article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry described above and/or communicated via a network or using other transmission medium and configured to control appropriate processing circuitry. For example, programming may be provided via appropriate media including for example articles of manufacture.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 18 may include a display 20 (e.g., cathode ray tube, LCD, etc.) configured to depict visual information as well as a keyboard, mouse and/or other input device 22. Any other suitable apparatus for interacting with a user may also be utilized.

The above-described embodiment comprises an integrated unit configured to process documents and display visualizations of the associations of the documents and related information for observation by a user. Other configurations are possible wherein apparatus 10 is configured as a networked server configured to process documents and generate files for creating visualizations. One or more clients (not shown) may use displays of respective terminals configured to access the files for creating the visualizations for observation by one or more user. Other configurations of apparatus 10 are possible.

Figure 2:
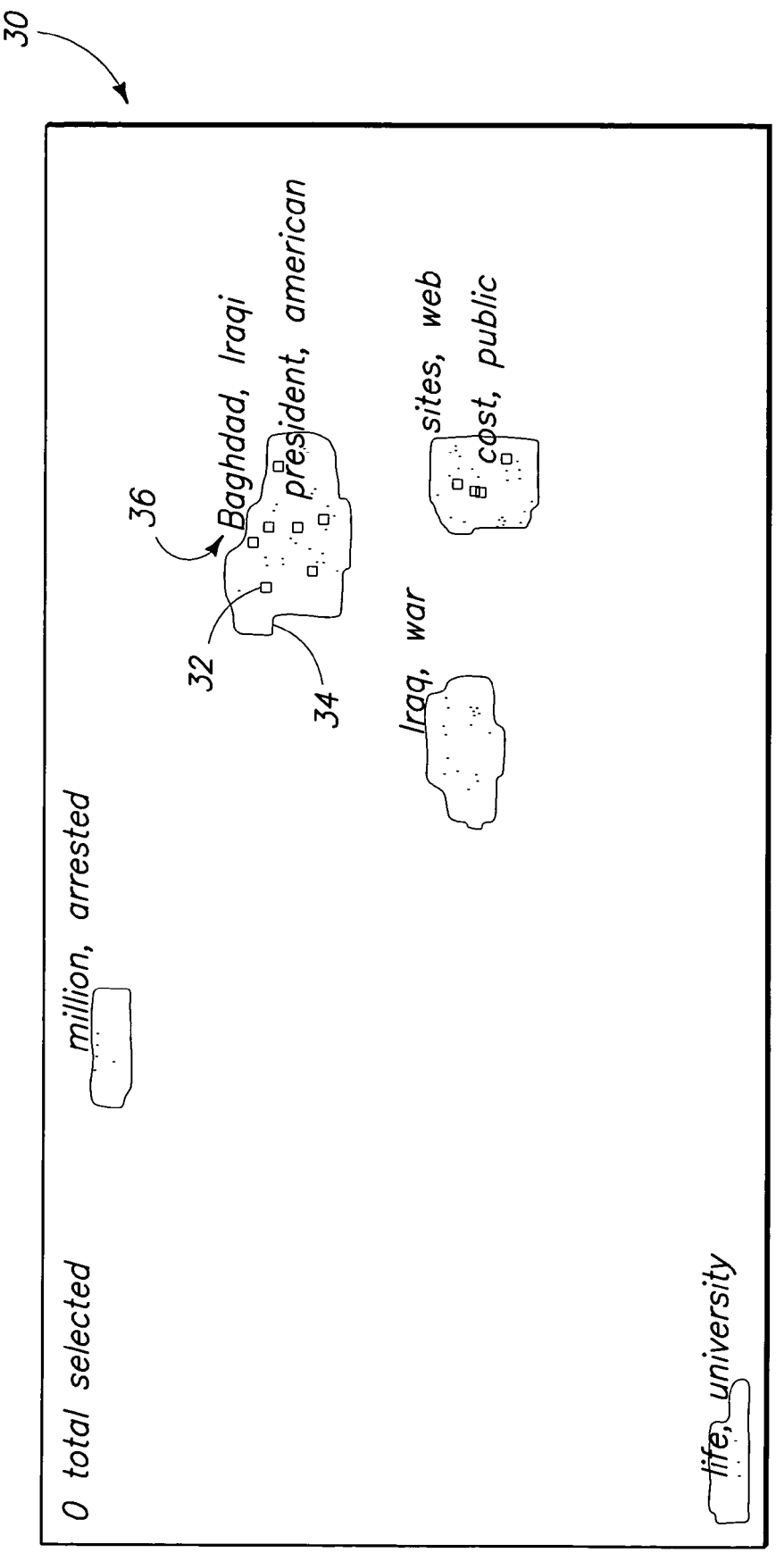
FIG. 2 is a screen display illustrating an exemplary visualization of a plurality of associations of a plurality of documents at a given moment in time according to one embodiment.

Referring to FIG. 2, an exemplary screen display 30 depicted by display 20 and comprising a visualization of associations of documents at a moment in time is shown. Screen display 30 shows one possible example for depicting results of processing a set of documents at a moment in time. According to one implementation, data visualization apparatus 10 may be configured to implement SPIRE or IN-SPIRE™ visual analytics systems available from the Pacific Northwest National Laboratory at http://in-spire.pnl.gov and described for example in U.S. Pat. Nos. 4,839,853, 6,298,174, 6,484,168, 6,584,220, 6,772,170, the teachings of which are incorporated herein by reference. Other arrangements for depicting the results of document processing may be provided in other embodiments. For example, as mentioned below, screen display 30 illustrates clusters of associations of documents which may be incrementally updated. Other formats are possible for depicting associations of documents and which may be incrementally updated, for example, including a landscape metaphor and/or a rectangular metaphor.

In the illustrated screen display 30, a plurality of documents are represented by respective dots 32 which may be arranged in a plurality of clusters 34. Documents which are associated with one another as a result of the processing by apparatus 10 may be arranged in one of the clusters 34. Additionally, the processing circuitry 14 may determine and associate a plurality of labels 36 with the clusters 34 and which are generally indicative of content or subject matter of the documents which are associated with the cluster 34. A user may interact via user interface 20 with the visualization of the screen display 30. In one example, a user may select a dot 32 of interest and the selection may provide additional details, such as the title, author, publication date, contents, etc. of the respective document represented by the selected dot.

As mentioned above, data visualization apparatus 10 is configured in one embodiment to access and process a dynamically changing set of documents, and accordingly, the screen display 30 may change over time to reflect changes in the corpus of documents being analyzed at different moments in time. In addition; in one embodiment, information regarding dynamic changes to a collection of documents may be depicted for a user via the screen display 30. For example, documents which are received and processed relatively recently by apparatus 10 may be displayed as dots 32 having a different color than other dots and after a period of time (e.g., 10 minutes), the color may be changed to the color of the other dots 32.

The above-mentioned IN-SPIRE™ data analytics system operated upon static data sets. For example, a document corpus containing a given number of documents is accessed and screen display 30 may be generated following the processing. At least some aspects of the disclosure describe methods and apparatus for processing and displaying associations of documents (e.g., using IN-SPIRE) which may be dynamically received and/or aged off (or otherwise added or removed from a set of documents being analyzed) at a plurality of moments in time. One embodiment of the disclosure reduces an amount of time used by the apparatus 10 for processing a dynamic collection of documents. In one embodiment, results of previous processing of documents may be maintained and used for subsequent associations with newly received documents.

Some embodiments describe processing of documents using incremental indexing schemes to facilitate the identification of documents and associations of documents of dynamically changing data sets. Indexes may be generated and used by processing circuitry 14 to determine associations of documents during processing of the documents. An exemplary incremental indexing scheme may be incrementally updated at different moments in time, for example, corresponding to the timing of reception of new documents by apparatus 10 in but one operational embodiment. Increments may refer to status of visualizations and associations of documents at different moments in time of the dynamic collection of documents and based upon the documents present for analyzing at the respective moments in time. At least some aspects of disclosure reduce the processing performed by processing circuitry inasmuch as indexes may be updated without having to reprocess documents which have already been processed. Additional details are described with respect to exemplary embodiments below.

Additional aspects relate to aging off documents which have been processed and displayed in visualizations of display 20. In one example, documents are time-stamped upon receipt by apparatus 10 and information may be obtained regarding a date/time of publication of the respective documents. A threshold may be set (e.g., 1 hour, 1 day, etc.) which specifies when documents are aged off and removed from the system. In one example, the processing circuitry 14 may analyze the documents present in the system with respect to the threshold and age-off (e.g., remove) documents from the visualization, databases, and indices of apparatus 10 described below. In one example, processing circuitry 14 may perform the aging analysis at intervals corresponding to the date/time of receipt of new documents by the apparatus 10 or the date/time of publication. Intervals for performing the aging analysis may be based upon other criteria in other embodiments.

Figure 3:
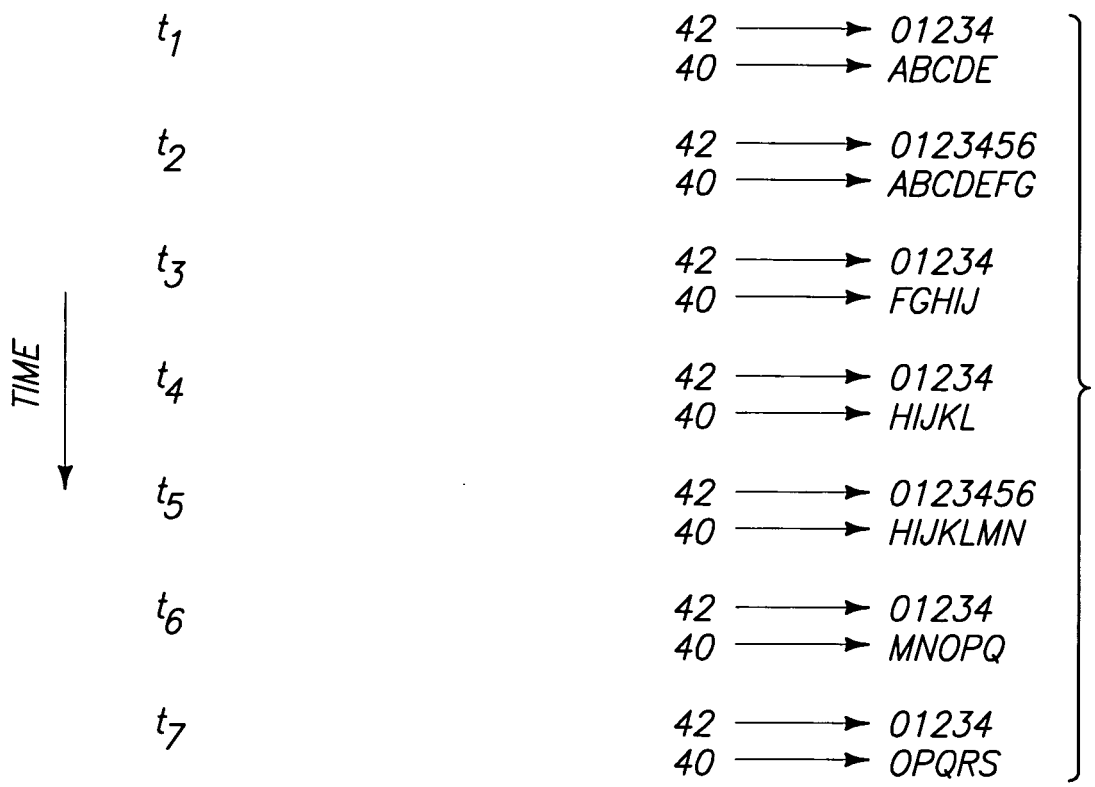
FIG. 3 is an illustrative representation of dynamic association of documents and sequence numbers at a plurality of moments in time according to one embodiment.

Referring to FIG. 3, dynamic associations for identifying documents which are received and aged off at different moments in time are described according to one embodiment. In FIG. 3, a plurality of sequential moments in time corresponding to plural increments are illustrated and progress from t1 (earliest) to t7 (latest). Associated with individual ones of the moments in time are a plurality of documents 40 (e.g., files including the text of the documents) represented by letters, and a plurality of sequence numbers 42 which are associated with respective ones of the documents. The documents 40 and sequence numbers 42 are arranged from left to right corresponding to the timing of arrival of the documents by apparatus 10. More specifically, in the example of FIG. 3, the leftmost document and sequence number corresponds to the document which was first received by apparatus 10 while the rightmost document and sequence number correspond to the document which was most recently received by apparatus 10.

Time t1 may correspond to an initial moment in time where documents A-E are available for processing by apparatus 10. Processing circuitry 14 may assign sequential sequence numbers 0-4 with respective ones of the documents A-E.

At time t2, no documents have aged off while new documents F, G have been received and processing circuitry 14 may assign subsequent sequence numbers 5, 6 to documents F, G.

At time t3, documents A-E have aged off while new documents H-J have been received. Processing circuitry 14 may shift the association of the sequence numbers and the documents such that the oldest document received by apparatus is sequence number 0. Accordingly, the documents F, G which remain from time t2 are shifted to sequence numbers 0, 1 and new documents H-J are assigned sequence numbers 2-4.

At time t4, documents F, G have aged off while new documents K, L have been received. Processing circuitry 14 may again shift the association of the sequence numbers and the documents and the next subsequent sequence numbers are associated with the new documents as shown.

At time t5, no documents have aged off while new documents M, N have been received. Processing circuitry 14 may associate the next subsequent sequence numbers 5,6 with the new documents M, N as shown.

At time t6, documents H-L have aged off while new documents O-Q have been received. Processing circuitry 14 may again shift the association of the sequence numbers and the documents and the next subsequent sequence numbers are associated with the new documents as shown.

At time t7, documents M, N have aged off while new documents R, S have been received. Processing circuitry 14 may again shift the association of the sequence numbers and the documents and the next subsequent sequence numbers are associated with the new documents as shown. According to one embodiment, and at any moment in time, the exemplary described usage of sequence numbers permits processing circuitry 14 to identify desired files of documents for processing to generate the data visualization such as FIG. 2 corresponding to the moment in time when processing of the documents occurs.

According to one embodiment, processing circuitry 14 may maintain a cumulative vocabulary list of features present in the documents being analyzed by apparatus 10 at a given moment in time. Features include any types of feature which may be measured in the documents. For example, features may include words, names, letter sequences, or phrases in illustrative examples. Although the following discussion including FIGS. 4 and 5 proceeds with respect to processing using words, it is to be understood that other features may be analyzed in other embodiments.

Upon receipt within apparatus 10, the processing circuitry 14 performs processing of the documents including analyzing the words of the documents and adds the words present in the documents to a cumulative vocabulary list. Common words such as "the", "or", "and", "a", etc. may be omitted from the vocabulary list.

The vocabulary list comprises a list of words (and/or other features) present within documents being visualized by apparatus 10 at a given moment in time. The list may also indicate the number of documents in which the respective words are present. Accordingly, if words present in new documents are not in the vocabulary list, processing circuitry 14 may add the new words to the vocabulary list. If words present in the new documents are already present in the vocabulary list, processing circuitry 14 may increment the value indicating the number of documents in which a word is present. In addition, the words of the vocabulary list may be associated with unique identifiers (e.g., word numbers) which may be thereafter used by apparatus 10 to numerically identify the respective words. The words may be arranged alphabetically at an initial moment in time and numbered sequentially in one embodiment. New words may be assigned subsequent ordered numbers as the new words are added in one embodiment.

When a document is aged off, the processing circuitry 14 may, for individual words of the removed document, decrement the value of the number of documents in which the respective word is present. If the number of documents for a given word reaches zero at a given moment in time, then the word may be removed from the vocabulary list as not being present in any of the documents being currently analyzed by the apparatus 10.

Processing circuitry 14 may implement processing including generation of forward and inverted indices for use in association of documents for visualization generation in one embodiment. As described below, the indices may be periodically dynamically modified or recalculated corresponding to the dynamic addition and/or removal of documents from the visualization.

Figure 4:
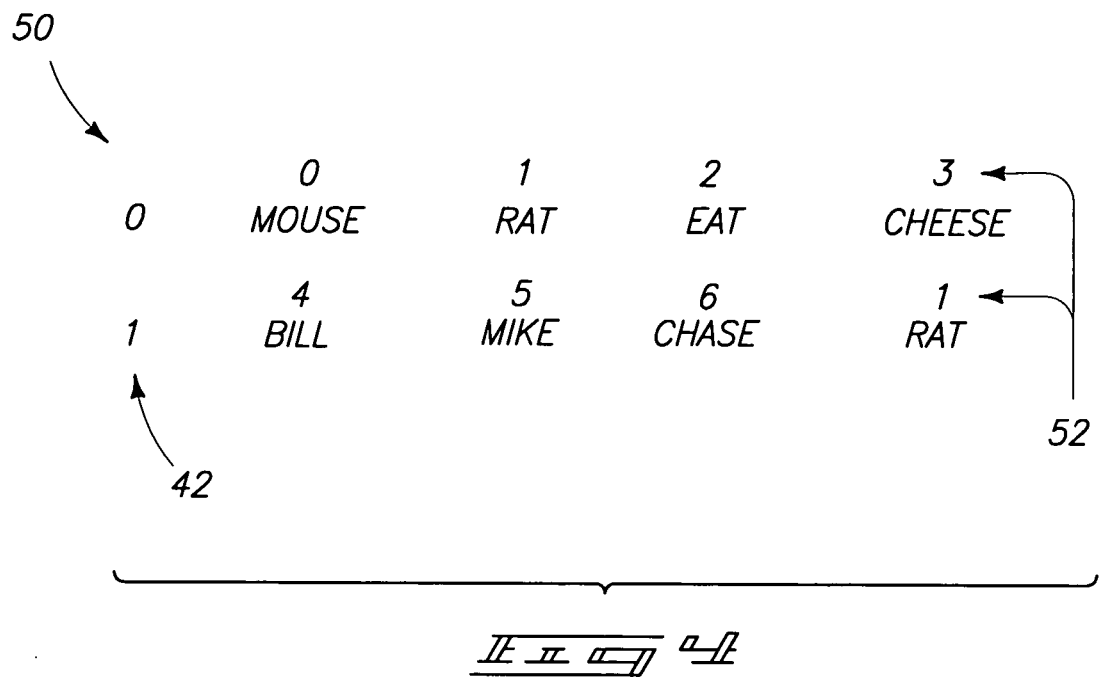
FIG. 4 is an illustrative representation of an example forward index indicating the words present in respective documents according to one embodiment.

Referring to FIG. 4, an exemplary forward index 50 generated during processing by processing circuitry 14 with respect to two documents is shown. To generate the forward index, the processing circuitry 14 associates each document (identified by one of document sequence numbers 42) with the word (and/or other feature) contents of the respective document using the vocabulary list, a plurality of word (and/or other feature) numbers 52 and the words (and/or other feature) of the respective documents. The words of the documents are identified by the processing circuitry 14, the vocabulary list is updated and used to create the forward index. The individual associations of the documents and word contents of the forward index are maintained during the presence of the respective documents in the visualizations prior to being aged off. The documents 0, 1 identified by document sequence numbers 42 and associated with the word numbers 52 may be referred to as processed documents and may be used to create associations of the documents for visualization, for example, using IN-SPIRE.

The forward index operates to associate or identify the words present within the documents associated with sequence numbers 0, 1 in the example of FIG. 4. Word numbers 52 from the vocabulary list are assigned to the words in the example of FIG. 4 for identification of the words. Rat is assigned word number 1 as shown in both documents 0, 1. The forward index includes the sequence number 42 of the respective documents 0, 1 and the respective word numbers 52 corresponding to the words present within respective documents 0, 1 in one embodiment. Accordingly, as shown, the documents and word contents of the documents are associated using the forward index via the document sequence numbers 42 and word numbers 52 in one embodiment. As new documents are accessed by apparatus 10, the new documents may be processed and added to the existing already processed documents of the forward index and used to generate subsequent associations of documents for visualization. The new visualizations may use both the previously processed documents and newly processed documents to avoid or reduce duplicative processing or computations in one embodiment.

Figure 5:
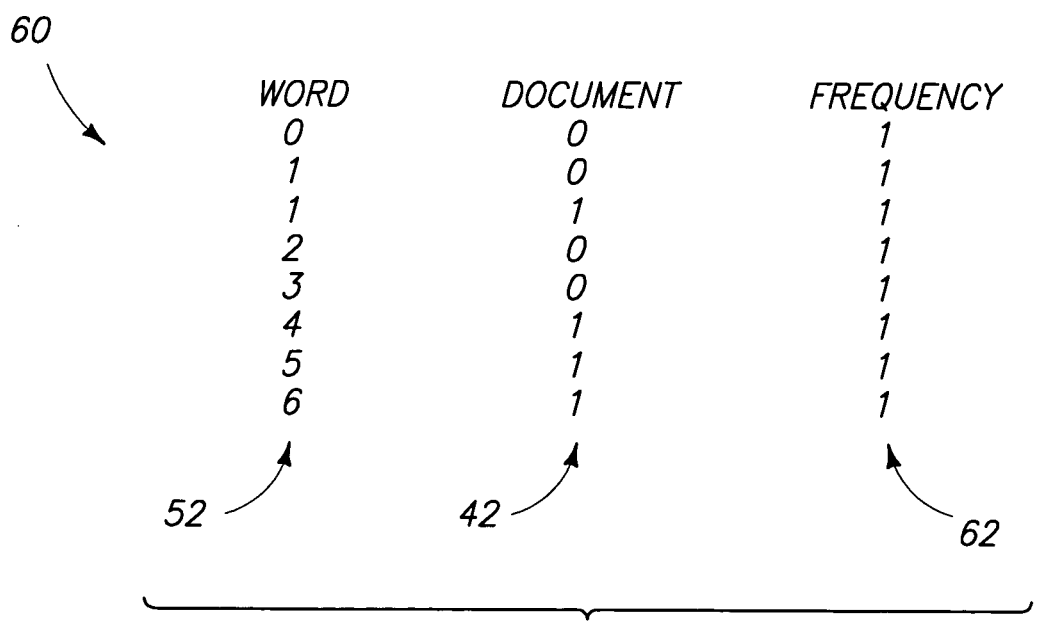
FIG. 5 is an illustrative representation of a reverse index indicating the documents in which given words are present according to one embodiment.

Referring to FIG. 5, an exemplary reversed or inverted index 60 is shown which may be calculated from the forward index 50. The reversed index operates to identify, for a given word, the documents in which the word is present. The words are identified by word numbers 52 and the documents are identified by document sequence numbers 42 in the illustrative example. As shown in FIG. 5, the number of occurrences of the word in the respective document are indicated by the frequency 62 (all words only occur once in documents 0, 1 in the example of FIG. 5).

In accordance with one dynamic embodiment, processing circuitry 14 is configured to update the visualization (e.g., FIG. 2) corresponding to the documents present in the apparatus 10 at respective moments in time. The forward and reverse indices are used by processing circuitry 14 during processing to generate the associations of the documents including processing comprising generating topicalities, association matrices and/or document vectors in accordance with SPIRE or IN-SPIRE visualizations of some exemplary embodiments.

Processing circuitry 14 may update the visualization at a plurality of increments or intervals to include new documents and remove aged-off documents in one embodiment. Intervals may be defined in one embodiment by the reception of one or more new documents by apparatus 10. In other embodiments, intervals may be defined differently, such as corresponding to a plurality of moments in time.

According to some embodiments, processing circuitry 14 may utilize information where possible from previously processed documents to reduce computations, processing time, etc. at new intervals. Updating the sequence numbers during the dynamic reception of new documents and aging-off of old documents facilitates the leveraging of previously performed computations and the identification of specific documents at different moments in time and corresponding to different intervals. In addition, the mapping of words (or features) and respective word (or feature) numbers 52 may also be incrementally updated in a fashion similar to the embodiment described with respect to FIG. 3.

For example, at an individual interval (e.g., corresponding to the arrival of one or more new documents at a moment in time in the described example), the processing circuitry 14 may update the association of documents and sequence numbers as described with respect to the exemplary embodiment of FIG. 3 and timestamp the new documents which are received by apparatus 10. Thereafter, the processing circuitry 14 may identify documents which should be aged-off. In one embodiment, the processing circuitry 14 compares the timestamps of the documents with respect to a threshold indicative of an amount of time corresponding to the window of documents being processed. If the amount of time from the timestamp of a given document to the present time exceeds the threshold, the document may be aged-off. In one embodiment, the visualizations do not depict aged-off documents or associations of the aged-off documents.

According to one embodiment, the processing circuitry 14 updates the vocabulary list and may use the forward index to identify the words present in a document to be aged off. The counts of the individual words present in the aged off document are decremented in the word vocabulary. If the count for a given word is dropped to zero as a result of the decrementing, the word may be removed from the word vocabulary.

Thereafter, the counts of words of the new documents and present in the vocabulary list are incremented, or if a word appears for the first time, the word may be added to the vocabulary list with a count of one.

Next, the processing circuitry 14 may update an existing forward index by removing aged-off documents and associating updated document sequence numbers 42 with the word numbers 52 of the respective documents (e.g., with respect to the example of FIG. 3 at the increment of time t4, the processing circuitry 14 removes documents F-G from the forward index and reassigns the associations of the word numbers 52 to the new sequence numbers). Thereafter, the new documents are added to the forward index with the associations of the sequence numbers 42 and the respective word numbers 52 corresponding thereto for the new documents. According to one embodiment, documents already present in the apparatus 10 at an interval are not reprocessed for the forward index but instead the sequence numbers are reassigned permitting the documents to be identified without the computational cost and time for reprocessing such documents to identify the words present in the already processed documents.

After the updating of the forward index, the inverted index may be entirely regenerated corresponding to the newly updated forward index, or differentially adjusted in a process similar to the described adjustment of the forward index. After the generation of the forward and inverted indices, processing circuitry 14 may utilize the indices to perform the processing including associating the documents with one another. Indices assist with identification of the documents and words during the processing to form the vectors, matrices, etc. In the exemplary embodiment wherein SPIRE or IN-SPIRE processing is implemented, the processing circuitry may use the forward and inverted indices to perform topicality processing for identifying words useful for discrimination of the documents and forming clusters, calculate association matrices, calculate document vectors, and to generate visualization files which may be used to form the visualizations upon display 20 corresponding to the respective moments in time. The above-exemplary processing may be repeated at each subsequent interval. In the described embodiment, documents received at different moments in time (via different increments) may be associated with one another prior to the documents being aged-off.

At least some aspects of the presently described embodiment reduce the processing performed by processing circuitry 14 to analyze a dynamically changing set of documents. For example, in one embodiment described above, the vocabulary list may be updated at a plurality of moments in time including adding and deleting words to the existing list as the documents dynamically change. In addition, forward indexes may be dynamically updated using the sequence numbers. For example, previously indexed documents are not reprocessed as described with respect to FIG. 4 but merely updated to add new documents and remove aged documents. New reverse indices may be created using the plural forward indices following the respective updates of the forward index in one embodiment. As described below, the vocabulary list and forward index are dynamically updated by merely adding and removing new and aged documents, respectively, as opposed to being entirely recalculated at the different increments which conserves processing resources.

Referring to FIG. 6, an exemplary screen display 80 which may be generated by display 20 in accordance with additional embodiments is shown. The screen display 80 is a histogram depicting a plurality of vertical bars 82 corresponding to a plurality of x-axis locations 84 which corresponds to the window of time of documents being analyzed. Indicia at the locations 84 may represent a description of the time intervals being utilized. For example, indicia may show date/time of publication of the respective documents (e.g., hours of publication are depicted in the illustrated example of FIG. 6). Other graphical representations may be used to depict the information shown in FIG. 6 in other embodiments.

The vertical bars 82 illustrate quantities of publications which were published at respective moments in time depending upon their publication date/time in the exemplary illustration and which are depicted using a visualization such as shown in screen display 30 of FIG. 2. More specifically, in the illustrated figure, vertical bars 82 are placed at x-axis locations 84 corresponding to a time of publication represented by hours of a day. As time progresses, the bars 82 move left across the screen display 80. Individual bars 82 may also include representative indicia identifying the quantity of documents represented by the respective bars 82 as shown in FIG. 6.

Time moves from moves from right to left in the embodiment of FIG. 6 and the rightmost bar 82 represents publications which have been most recently published and the leftmost bar 82 indicates documents which were published the comparatively longest time ago. Overlaid on this depiction, information can be added about those documents recently received and those about to age off, for example, as described below in one embodiment.

One or more of the bars 82 or portions of the bars 82 may be distinguished from other bars 82 to convey information to a user in one embodiment. As shown in the example of FIG. 6, the middle bars 82 may be depicted using a base color while other portions or entireties of other bars 82 may be depicted using a different color or otherwise distinguished for observation by a user. For example, a first alternate color 86 may be used to represent documents which were most recently received by apparatus 10 and a second alternate color 88 may be used to represent documents which are next to be aged-off. As shown in FIG. 6, time of receipt may not be the same as publication time.

The date of reception of the documents within apparatus 10 may be used to determine if an alternate color 86 or 88 is suitable in one embodiment. The date/time of reception may be compared with a threshold to determine if color 86 should be used to illustrate the document has been recently received (e.g., the color 86 is used if the time between reception and the present time is less than the threshold). Color 88 may be used if the time between date/time of reception and the present time is greater than another threshold and to indicate imminent aging off of the documents. The thresholds may be selected corresponding to the window of documents being displayed in the visualization. Other embodiments are possible for distinguishing bars 82, bar portions or other representations of quantities of documents. For example, documents may be in bars arranged according to date/time of receipt and/or other distinguishing colors 86, 88 may be used to convey information regarding date/time of publication in other embodiments. Further, other graphical formats may be used to illustrate quantities of documents in other embodiments.

At least one embodiment enables a user to change a mode of operation from active to paused to pause updates to the visualization which is depicted by display 20. During one embodiment of active mode of operation, apparatus 10 continually updates the visualization depicted by the display 20 to reflect associations of newly received documents and aged-off documents. In one embodiment, the updating is automatic without user input and based upon the dynamic documents being processed.

According to one embodiment, during a paused mode of operation, the visualization depicted when the paused mode of operation was entered is displayed and updates resulting from the arrival of new documents and aging off of old documents may be calculated but adjustments resulting therefrom are not made to the visualization. Accordingly, in one embodiment, the state of the visualization when pause was entered is maintained until a user again desires active mode to be resumed. This may give the user an opportunity to further study the visualization without changes to the contents of the documents.

As mentioned above, in one embodiment, processing circuitry 14 may continue to process new visualizations to account for new documents and aged-off documents (e.g., associate the new documents accessed during the paused mode of operation with the existing documents) although the resultant visualizations are not illustrated during the paused mode of operation. This facilitates resumption to the active mode of operations where apparatus 10 may add all increments to the visualization to provide the user with a current state of the visualization upon a change back to active mode of operation.

Figure 7A:
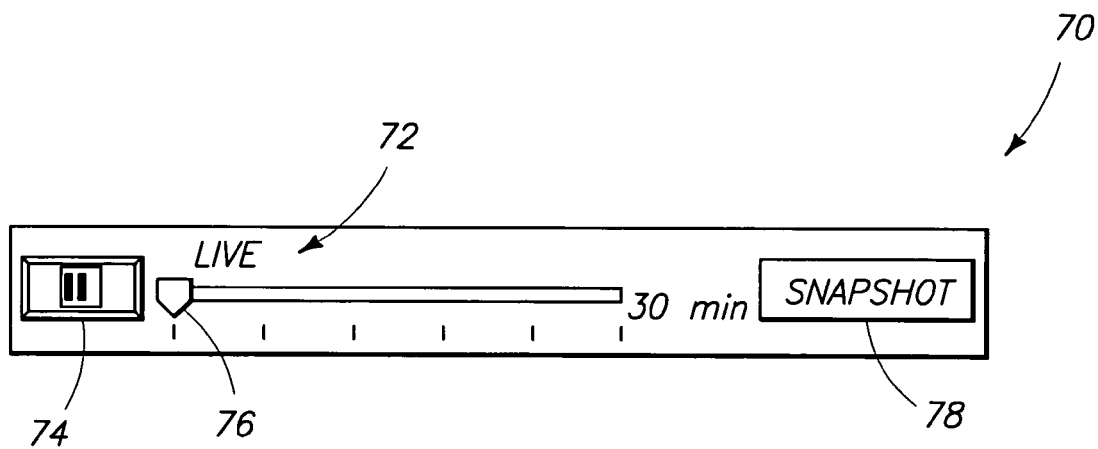
FIGS. 7A and 7B are user interfaces which may be used to control operations of the data visualization apparatus according to one embodiment.
Figure 7B:
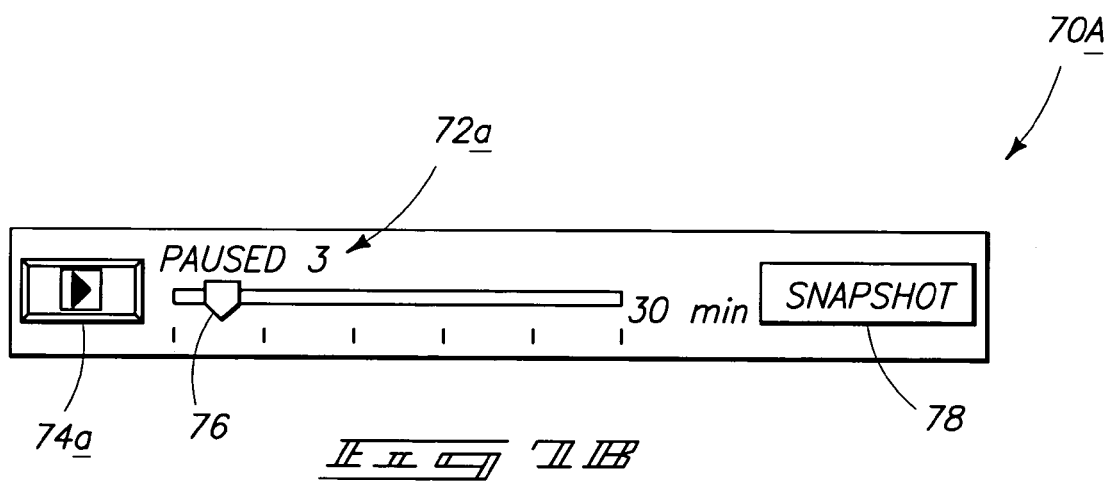

Referring to FIGS. 7A and 7B, a user interface 70, 70a which may be generated by display 20 is shown at different operational states of apparatus 10. For example, FIG. 7A corresponds to live or active state of operations of apparatus 10 wherein screen displays 30, 80 (FIGS. 2 and 6) are dynamically updated as documents are received by apparatus 10. Indicia 72 of FIG. 7A illustrates the active mode of operation. A slider tab 76 is positioned at the leftmost location of the slider indicating that increments of documents have been loaded into the visualizations and the status is current.

A button 74 may be selected by the user to toggle the mode of operation from active of FIG. 7A to paused of FIG. 7B. Indicia 72a of FIG. 7B depicts the status of "paused" wherein increments of documents are not dynamically updated upon screen display 30 or 80 (FIGS. 2 and 6). The paused mode of operation may be useful to a user who wishes to study and/or interact with visualizations at a given moment in time. Indicia 72a and slider tab 76 illustrate a length of time which has passed since a last increment of documents has been loaded into visualizations of screen displays 30, 80 (FIGS. 2 and 6). In addition, a color of the interface 70a may be changed when an increment of new documents has been received and not updated in the visualization. A user may depress button 74a when desired to return to a dynamic mode of operation.

As mentioned, documents may be received by apparatus 10 during operation in a paused mode. In one embodiment, apparatus 10 may continue to process the documents even though the visualizations are not updated to reflect the presence of the new documents or aging off of stale documents. For example, in one embodiment, the processing circuitry 14 may update the vocabulary list, update the forward index, recalculate the reverse index and perform other processing of newly received documents. The processed information may be used to create an up-to-date visualization when the user unpauses the mode of operation of apparatus 10. If the apparatus 10 has been paused for an extended period of time, a plurality of documents may have been received and processed at a plurality of increments. The processing circuitry 14 may roll all increments forward to return the apparatus 10 to dynamic up-to-date operation and provide up-to-date visualizations when apparatus 10 is unpaused.

Other aspects of the disclosure implement synchronization operations to accommodate pausing and dynamic modes of operation of apparatus 10. For example, a file of a visualization may be accessed and partially processed by processing circuitry 14 or otherwise unavailable (e.g., responsive to user input) for short periods of time. Synchronization may preclude dynamic updates of the active mode until the file is released by processing circuitry 14.

More specifically, in one embodiment, processing circuitry 14 may be configured to operate plural processes in parallel including a document ingest process and a visualization process. The ingest process is configured to access and process documents newly received by apparatus 10 (e.g., calculate or update the vocabulary list, the forward and reverse indexes, topicalities, the association matrices, document vectors and visualization files). Exemplary visualization files include data to control display of association of documents (e.g., raster data of clusters using screen display 30) and cluster labels corresponding to the clusters of documents presently processed by apparatus 10.

The ingest process may indicate to the visualization process when the processed data is ready for access and display. During an un-paused, dynamic mode of operation of apparatus 10 and following the data ready indication from the ingest process, the visualization process may access the processed data (e.g., visualization files) and control the display 20 to depict the respective visualizations responsive thereto. During a paused mode of operation, the ingest process may be configured to continue to process the incoming documents; however, the visualization process may be configured to maintain the visualizations in the state when pausing occurred. Thereafter, when apparatus 10 is un-paused, the visualization process may access the processed data and create the visualizations to a current, up-to-date state in one embodiment. Processing circuitry 14 may coordinate and synchronize the transfer of data from the ingest process to the visualization process to avoid errors (e.g., not accepting the processed data until files which may have been accessed by a user are cleared and available for updating using the newly processed data).

User interfaces 70, 70a also depict a snapshot button 78 in one embodiment. Snapshot button 78 may be used to cause apparatus 10 to save a view of the visualizations (e.g., FIG. 2) and associations of documents at a given moment in time. A created snapshot may be used to regenerate the visualizations and associations of documents when the snapshot was created at a subsequent moments in time. When snapshot button 78 is depressed by a user, processing circuitry 14 may store a dataset of document sequence numbers, the word vocabulary, forward and reverse indices, topicalities, association matrices, vectors, visualization files, and other information which may be accessed and used by processing circuitry 14 to regenerate the visualization when the snapshot was taken at subsequent moments in time.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer implemented document processing method comprising:
   accessing a plurality of initial documents;
   initially processing the initial documents to provide a plurality of initial representations for respective ones of the initial documents, wherein the initial representations include a plurality of associations of the initial documents with a plurality of features which occur in respective ones of the initial documents;
   using the initial representations, initially identifying a plurality of associations of the initial documents with respect to one another;
   after the initially identifying, accessing a plurality of subsequent documents;
   subsequently processing the subsequent documents to provide a plurality of subsequent representations for respective ones of the subsequent documents, wherein the subsequent representations include a plurality of associations of the subsequent documents with a plurality of features which occur in respective ones of the subsequent documents; and
   using the initial and subsequent representations, subsequently identifying a plurality of associations of the initial documents with respect to the subsequent documents.

2. The method of claim 1 wherein the initial representations indicate the features which are present in a specific one of the initial documents.

3. The method of claim 2 wherein the initial representations further indicate which ones of the initial documents include a specific one of the features.

4. The method of claim 1 wherein the initial documents are not processed again to identify the associations of the initial documents with the features which occur in the respective ones of the initial documents after the initially processing.

5. The method of claim 1 wherein the initially processing comprises generating a list of the features present in the initial documents, and wherein the subsequently processing includes adding new features to the list which occur in the subsequent documents but do not occur in the initial documents.

6. The method of claim 5 further comprising, after the initially identifying, determining a period of time which has passed since one of the initial documents was accessed, and further comprising removing one of the features which is present in the one of the initial documents from the list of the features as a result of the period of time exceeding a threshold.

7. The method of claim 5 wherein the list of the features indicates numbers of occurrences of respective ones of the features in the initial documents, and further comprising, after the initially identifying, determining a period of time which has passed since one of the initial documents was accessed, and further comprising decrementing one of the numbers of occurrences for one of the features which occurs in the one of the initial documents as a result of the period of time exceeding a threshold.

8. The method of claim 1 wherein the initially processing generates a forward index comprising the initial representations, and the subsequently processing comprises adding the subsequent representations to the forward index.

9. The method of claim 8 further comprising, after the initially identifying, identifying one of the initial documents as being aged, and wherein the subsequently processing comprises removing one of the initial representations for the one of the initial documents from the forward index.

10. The method of claim 8 wherein the initially processing generates a reverse index which includes one list of the features and the initial documents which include respective ones of the features.

11. The method of claim 10 wherein the subsequently processing generates another reverse index which includes another list of the features and the initial and subsequent documents which include respective ones of the features.

12. The method of claim 8 wherein the forward index indicates which features are present in respective ones of the initial documents and the subsequent documents.

13. The method of claim 1 wherein the initially identifying comprises identifying a plurality of clusters of the initial documents and the subsequently identifying comprises identifying a plurality of clusters of the initial documents and the subsequent documents.

14. The method of claim 1 wherein the initially and subsequently processings individually comprise identifying the features present in respective ones of the initial documents and the subsequent documents.

15. The method of claim 14 wherein the initial documents are not processed again to identify the features present in the initial documents after the initially processing.

16. The method of claim 1 wherein the initial representations include the associations of the initial documents with the features which are words which occur in respective ones of the initial documents, and the subsequent representations include the associations of the subsequent documents with the features which are words which occur in respective ones of the subsequent documents.

17. The method of claim 16 wherein the initial representations include, for an individual one of the initial documents, a list of the words which are present in the individual one of the initial documents.

18. The method of claim 1 wherein the accessing the initial documents comprises accessing the initial documents from a dynamically changing corpus at an initial moment in time, and the subsequent documents are not present in the dynamically changing corpus at the initial moment in time.

19. An article of manufacture comprising:
storage media storing programming configured to cause processing circuitry to perform processing comprising:
accessing a plurality of initial documents;
initially processing the initial documents to provide a plurality of initial representations for respective ones of the initial documents, wherein the initial representations include a plurality of associations of the initial documents with a plurality of features which occur in respective ones of the initial documents;
using the initial representations, initially identifying a plurality of associations of the initial documents with respect to one another;
after the initially identifying, accessing a plurality of subsequent documents;
subsequently processing the subsequent documents to provide a plurality of subsequent representations for respective ones of the subsequent documents, wherein the subsequent representations include a plurality of associations of the subsequent documents with a plurality of features which occur in respective ones of the subsequent documents; and
using the initial and subsequent representations, subsequently identifying a plurality of associations of the initial documents with respect to the subsequent documents.

20. The article of claim 19 wherein the initial representations indicate the features which are present in respective ones of the initial documents.

21. The article of claim 19 wherein the initial documents are not processed again after the initially processing.

22. The article of claim 19 wherein the initially processing comprises generating a list of the features present in the initial documents, and wherein the subsequently processing includes adding new features to the list which occur in the subsequent documents but do not occur in the initial documents.

23. The article of claim 22 further comprising, after the initially identifying, identifying one of the initial documents as being aged, and further comprising removing one of the features which is present in the one of the initial documents from the list of the features as a result of the identifying the one of the initial documents as being aged.

24. The article of claim 22 wherein the list of the features indicates numbers of occurrences of respective ones of the features in the initial documents, and further comprising, after the initially identifying, identifying one of the initial documents as being aged, and further comprising decrementing one of the numbers of occurrences for one of the features which occurs in the one of the initial documents as a result of the identifying the one of the initial documents as being aged.

25. The article of claim 19 wherein the initially processing generates a forward index comprising the initial representations, and the subsequently processing comprises adding the subsequent representations to the forward index.

26. The article of claim 25 further comprising, after the initially identifying, identifying one of the initial documents as being aged, and wherein the subsequently processing comprises removing one of the initial representations for the one of the initial documents from the forward index.

27. The article of claim 25 wherein the initially processing generates a reverse index which includes one list of the features and the initial documents which include respective ones of the features.

28. The article of claim 27 wherein the subsequently processing generates another reverse index which includes another list of the features and the initial and subsequent documents which include respective ones of the features.

29. The article of claim 19 wherein the initially identifying comprises identifying a plurality of clusters of the initial documents and the subsequently identifying comprises identifying a plurality of clusters of the initial documents and the subsequent documents.

30. The article of claim 19 wherein the initially and subsequently processings individually comprise identifying the features present in respective ones of the initial documents and the subsequent documents.

31. The article of claim 30 wherein the initial documents are not processed again to identify the features present in the initial documents after the initially processing.

\* \* \* \* \*